Oct. 14, 1930.  L. OTTINGER  1,778,299

KEEPER FOR LATCH BOLTS

Filed Feb. 25, 1929

INVENTOR
Leon Ottinger
BY
ATTORNEY

Patented Oct. 14, 1930

1,778,299

UNITED STATES PATENT OFFICE

LEON OTTINGER, OF NEW YORK, N. Y.

KEEPER FOR LATCH BOLTS

Application filed February 25, 1929. Serial No. 342,540.

This invention relates to keepers for latch bolts.

The object of this invention is to provide a keeper having a dog movable bodily therein by the latch bolt as it enters said keeper, whereby said dog is made to impose laterally against said bolt an increasingly crowded action.

The present embodiment is an improvement over the one disclosed in my copending Patent No. 1,715,671, in that the crowding action of the dog is much more positive and efficient, and the dog is much less susceptible of being made inoperative by angular or other undesirable displacement with respect to the strike plate.

The accompanying drawing illustrates my invention as applied to an automobile door:

Figure 1:
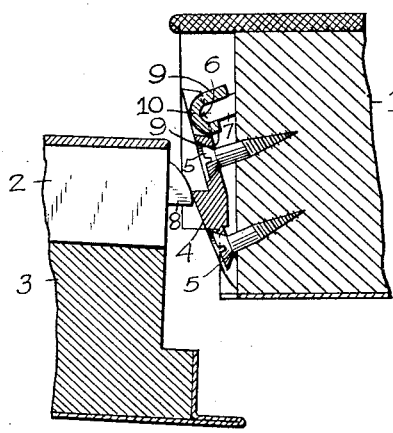
Fig. 1 is a horizontal sectional view showing the relation of latch bolt and keeper before the door is closed.
Figure 2:
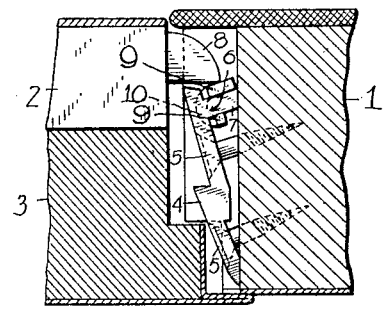
Fig. 2 is a similar view when the door is closed.
Figure 3:
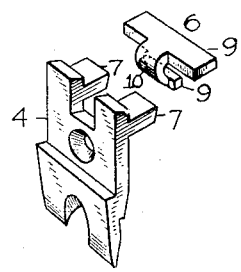
Fig. 3 is a perspective detail of the dog and strike plate comprising the keeper for the latch bolt in disassembled relation.

Figs. 1 and 2 show the application of my keeper to an automobile door 1 in conjunction with a latch case 2 mounted on an adjacent part of the automobile body 3.

The keeper comprises a strike plate 4 which is secured to the door 1 by screws 5 and an integral dog 6. The strike plate is provided with a rearwardly extending portion, in this embodiment guide rails 7, 7, inclined toward the line of projection of the latch bolt 8.

The dog is mounted for bodily movement on said rails and comprises parallel arms or cross bars 9, 9 which are disposed transversely across the rails, an arm on either side so as to embrace the same, and a portion 10 which is disposed between the rails and connects the arms.

The dog is adapted to be engaged by the entering edge of the bolt and pushed thereby rearwardly along said rails, and as the dog is moved on an incline toward the line of projection of the bolt, the dog exerts an increasingly greater crowding action thereon.

The advantage of having the dog bodily movable as against one stationary is that in the latter instance when the bolt is all the way in, the dog or inclined portion of the keeper binds the bolt so that it is retracted with great difficulty. With the dog movable the bolt is readily retracted.

The invention is, of course, susceptible of other modifications and embodiments which come within the principle of the invention as expounded in the accompanying claims.

Having thus described my invention, what I claim is:

1. A keeper for a spring-projected latch bolt comprising a strike plate having a rearwardly extending portion inclined toward the line of projection of said bolt, and a dog embracing said portion movable bodily therealong by said bolt to crowd the bolt into said keeper.

2. A keeper for a spring-projected latch bolt comprising a strike plate having rearwardly extending guide rails inclined toward the line of projection of said bolt, and a dog embracing said rails and movable bodily therealong by said bolt to crowd the bolt into said keeper.

3. A keeper for a spring-projected latch bolt comprising a strike plate having rearwardly extending guide rails inclined toward the line of projection of said bolt, and a dog comprising parallel arms disposed transversely of and embracing said rails and joined by a portion disposed between said rails, said dog being movable bodily along said rails by said bolt to crowd the bolt into said keeper.

4. A keeper for a spring-projected latch bolt comprising a strike plate having extending rearwardly from its rear face guide rails inclined toward the line of projection of said bolt, and a dog comprising parallel arms disposed transversely of and embracing said rails and joined by a portion disposed between said rails, said dog being movable bodily along said rails by said bolt to crowd the bolt into said keeper.

In testimony whereof I affix my signature.

LEON OTTINGER.